(12) United States Patent
Van Doren et al.

(10) Patent No.: US 7,856,534 B2
(45) Date of Patent: Dec. 21, 2010

(54) TRANSACTION REFERENCES FOR REQUESTS IN A MULTI-PROCESSOR NETWORK

(75) Inventors: Stephen R. Van Doren, Northborough, MA (US); Simon C. Steely, Jr., Hudson, NH (US); Gregory Edward Tierney, Chelmsford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2015 days.

(21) Appl. No.: 10/758,352

(22) Filed: Jan. 15, 2004

(65) Prior Publication Data

US 2005/0160132 A1    Jul. 21, 2005

(51) Int. Cl.
*G06F 12/00* (2006.01)
(52) U.S. Cl. ................. 711/141; 711/150; 711/E12.032
(58) Field of Classification Search .................. 711/141
See application file for complete search history.

(56) References Cited

U.S. PATENT DOCUMENTS

| | | | |
|---|---|---|---|
| 5,404,483 A | | 4/1995 | Stamm et al. |
| 5,657,472 A | * | 8/1997 | Van Loo et al. ............. 711/158 |
| 5,721,855 A | | 2/1998 | Hinton et al. |
| 5,802,577 A | | 9/1998 | Bhat et al. |
| 5,829,040 A | | 10/1998 | Son |
| 5,875,467 A | | 2/1999 | Merchant |
| 5,875,472 A | | 2/1999 | Bauman et al. |
| 5,958,019 A | | 9/1999 | Hagersten et al. |
| 6,055,605 A | | 4/2000 | Sharma et al. |
| 6,081,874 A | * | 6/2000 | Carpenter et al. ........... 711/141 |
| 6,085,263 A | | 7/2000 | Sharma et al. |
| 6,108,737 A | | 8/2000 | Sharma et al. |
| 6,122,714 A | * | 9/2000 | VanDoren et al. ........... 711/150 |
| 6,279,084 B1 | | 8/2001 | Van Doren et al. |
| 6,345,342 B1 | | 2/2002 | Arimilli et al. |
| 6,457,100 B1 | | 9/2002 | Ignatowski et al. |
| 6,490,661 B1 | | 12/2002 | Keller et al. |
| 6,631,401 B1 | | 10/2003 | Keller et al. |
| 2001/0034815 A1 | | 10/2001 | Dugan et al. |
| 2002/0009095 A1 | | 1/2002 | Van Doren et al. |
| 2002/0073071 A1 | | 6/2002 | Pong et al. |
| 2002/0124143 A1 | * | 9/2002 | Barroso et al. .............. 711/145 |
| 2002/0144063 A1 | | 10/2002 | Peir et al. |
| 2002/0184453 A1 | * | 12/2002 | Hughes et al. .............. 711/150 |
| 2002/0194290 A1 | | 12/2002 | Steely, Jr. et al. |
| 2003/0018739 A1 | | 1/2003 | Cypher et al. |
| 2003/0076831 A1 | | 4/2003 | Van Doren et al. |
| 2003/0140200 A1 | | 7/2003 | Jamil et al. |
| 2003/0145136 A1 | | 7/2003 | Tierney et al. |
| 2003/0195939 A1 | | 10/2003 | Edirisooriya et al. |

(Continued)

OTHER PUBLICATIONS

Rajeev, Joshi, et al., "Checking Cache-Coherence Protocols with TLA+", Kluwer Academic Publishers, 2003, pp. 1-8.

(Continued)

*Primary Examiner*—Shane M Thomas
*Assistant Examiner*—Ryan Dare (57) ABSTRACT

One disclosed embodiment may comprise a system that includes a home node that provides a transaction reference to a requester in response to a request from the requester. The requester provides an acknowledgement message to the home node in response to the transaction reference, the transaction reference enabling the requester to determine an order of requests at the home node relative to the request from the requester.

40 Claims, 5 Drawing Sheets

U.S. PATENT DOCUMENTS

2003/0200397 A1    10/2003    McAllister et al.

OTHER PUBLICATIONS

Martin, Milo M.K., et al., "Token Coheence: Decoupling Performance and Correctness", ISCA-30, pp. 1-12, Jun. 9-11, 2003.

Acacio, Manuel E., et al., "Owner Prediction for Accelerating Cache-to-Cache Transfer Misses in a cc-NUMA Architecture", IEEE 2002.
Gharachorloo, Kourosh, et al., "Architecture and Design of AlphaServer GS320", Western Research Laboratory.
Gharachorloo, Kourosh, et al., "Memory Consistency and Event Ordering in Scalable Shared-Memory Multiprocessors", Computer Systems Laboratory, pp. 1-14.

* cited by examiner

TRANSACTION REFERENCES FOR REQUESTS IN A MULTI-PROCESSOR NETWORK

BACKGROUND

Multi-processor systems employ two or more computer processors that can communicate with each other, such as over a bus or a general interconnect network. In such systems, each processor may have a memory cache (or cache store) that is separate from the main system memory. Each individual processor can access memory caches of other processors. Thus, cache memory connected to each processor of the computer system can often enable fast access to data. Caches can reduce latency associated with accessing data on cache hits and reduce the number of requests to system memory. In particular, a write-back cache enables a processor to write changes to data in the cache without simultaneously updating the contents of memory. Modified data can be written back to memory at a later time if necessary.

Coherency protocols have been developed to ensure that whenever a processor reads a memory location, the processor receives the correct or true data. Additionally, coherency protocols ensure that the system state remains deterministic by providing rules to enable only one processor to modify any part of the data at any given time. If proper coherency protocols are not implemented, however, inconsistent copies of data can be generated.

A network architecture can be implemented as an ordered network or an unordered network. An ordered network generally employs at least one ordered channel for communicating data between nodes in the network. The ordered channel is configured to help ensure that transactions issued to a common address are processed in order. Accordingly, when multiple requests for the same block of data are transmitted on an ordered channel, the network (e.g., switch fabric) communicates the requests in order. An unordered network does not employ a mechanism to maintain ordering of requests that are communicated in the network. As a result, different messages can travel along different paths through the unordered network can take different amounts of time to reach a given destination. Consequently, different requests or other message for the same data can arrive at an owner of the data in a different order from the order in which the requests were transmitted.

SUMMARY

One embodiment of the present invention may comprise a system that includes a home node that provides a transaction reference to a requester in response to a request from the requester. The requester provides an acknowledgement message to the home node in response to the transaction reference, the transaction reference enabling the requester to determine an order of requests at the home node relative to the request from the requester.

Another embodiment of the present invention may comprise a multi-processor system that includes a first requesting processor that provides a first request for data to a home node and a second requesting processor that provides a second request for the data to the home node. The home node comprises a transaction resource for managing requests for the data. The home provides a transaction reference message to one of the first and second requesting processors, the one of the first and second requesting processors employing the transaction reference message to ascertain a relative order of the first and second requests for the data ordered at the home node.

Still another embodiment of the present invention may comprise a processor in a multi-processor network. The processor includes a transaction structure that contains at least a first entry associated with a first request for data issued by the processor. The first entry includes a transaction reference field that has a value based on a transaction reference message from a home node for the data, the value of the transaction reference field providing an indication of an order of transactions for the data at the home node. A controller controls how to respond to a second request for the data received from the home node based on the value of the transaction reference field.

Yet another embodiment of the present invention may comprise a multi-processor system that includes means for providing a transaction reference message substantially in parallel with at least one snoop request from a home node in response to a first request for data from a requesting processor. Means are also provided for setting a transaction reference field at the requesting processor in response to the transaction reference message. Means are further provided for responding to at least a second request provided to the requesting processor based on a condition of the transaction reference field when the at least a second request is received.

Another embodiment of the present invention may comprise a method that includes providing a fill marker message from a home node in response to a first request for a block of data from a requester. A fill marker status field is set at the requester in response to the fill marker message from the home node. A response is provided from the requester to a second request for the block of data that varies temporally based on a condition of the fill marker status field at the requester.

DETAILED DESCRIPTION

Figure 1:
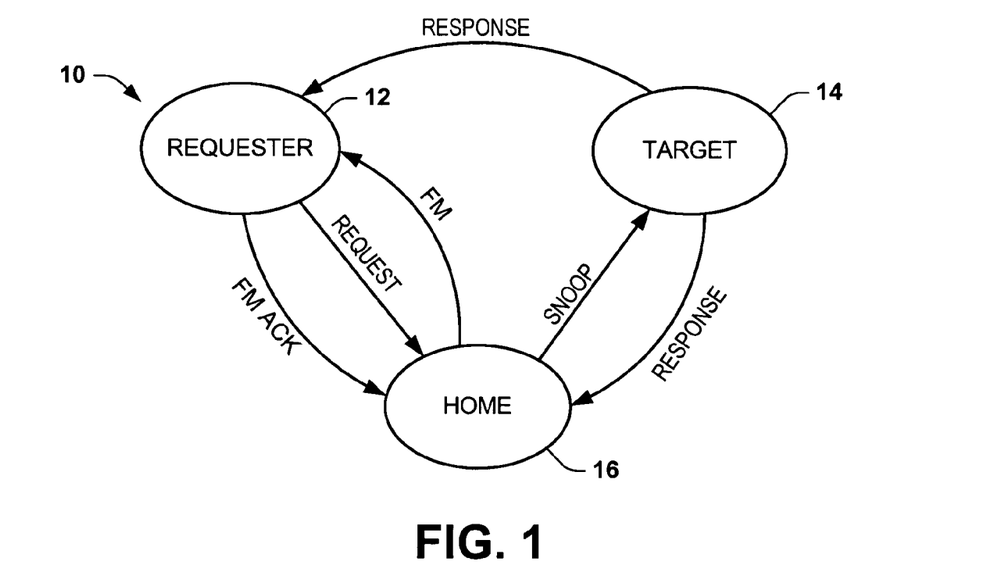
FIG. 1 depicts an example of a transaction being implemented in a multi-processor network.

FIG. 1 depicts an example of a multi-processor network 10 that includes a plurality of nodes 12, 14 and 16. The nomenclature for the nodes 12, 14 and 16 is generally descriptive of the nodes relationship to a given line of data. As used herein, a node that issues a request, such as a read, or write request, defines a source node or requester node 12. Other nodes within the network 10 are potential targets of the request, such as target node 14. Additionally, each memory block in the network 10 can be assigned a home node 16 that maintains necessary global information and a data value for that memory block, such as node 16. A memory block can occupy part of a cache line, an entire cache line, or span across multiple cache lines. For purposes of simplicity of explanation, however, this disclosure assumes that a "memory block" occupies a single "cache line" in a cache or a single "memory line" in a memory, such as at the home node 16.

The network 10 employs a cache coherency protocol to control access to data by the requester node. For example, the network 10 can employ a null-directory cache coherency protocol or a directory-based cache coherency protocol. In a null-directory-based protocol, the home node 16 corresponds to a shared memory structure that receives a request from the requester 12. The home node 16 employs a transaction management resource to manage the request and then snoops the network 10 for a coherent copy of the requested data. In a standard directory-based protocol, the home node 16 provides a shared memory structure, but also includes a directory (not shown) that contains information identifying where in the system 10 a coherent copy of the data should be located for each memory block.

In the example of FIG. 1, the requester 12 provides a request to the home node 16. The request can be a read or write request, for example. The home node 16 responds to the request by providing a transaction reference message associated with the request, referred to herein as a fill marker (FM) message. The requester 12 responds to the FM message by returning a fill marker acknowledgement message, indicated at FM ACK. The requester 12 also sets a corresponding field (e.g., a status bit) in response to the FM message from the home node 16. Concurrent with sending the FM to the requester 12, the home node 16 provides a snoop or forward channel request to the target 14 corresponding to the request from the requester 12.

Assuming that the target node 14 contains an exclusive cached copy of the requested data, the target node 14 can provide a corresponding data response to the requester 12 in response to the snoop. The target node 14 also provides a response to the home node 16. The type of responses from the target node 14 generally depends on the state of the cached data at the target node and the particular cache coherency protocol being implemented in the network 10. For example, in a null-directory protocol, the response from the target 14 to the home node 16 can identify the fact that the target node 14 has provided a data response to fulfill the snoop from the home node 16. Alternatively, in a directory-based protocol, the target node 14 can provide a response to the home node 16, which response can include information that identifies the type of data response provided to the requester 12, information that identifies corresponding state changes at the requester and/or target as well as provides an up-to-date copy of the data. In the directory-based protocol, the home node 16 employs the response from the target node 14 to update directory state information associated with the data.

The fill marker (or transaction reference) enables the requester 12 to determine a relative order of requests at the home node 16, such as when more than one outstanding request for the same line of data exists concurrently in the network 10. The FM state information at the requester 12 provides a transaction reference to which the requester can ascertain a relative order (e.g., a temporal order based on when requests are received) at the home node 16 for the request issued by the requester 12 and a request provided from a different node in the network for the same line of data. For instance, if the requester receives a snoop from the home node 16 before the FM state information has been set, the requester "knows" that the snoop corresponds to a request that was issued before the request from the requester 12. Accordingly, the requester 12 can respond to the snoop based on the present state information associated with the requested data. If the requester 12 receives a snoop from the home node 16 while the FM state information is set in response to a FM message, the requester "knows" that the snoop corresponds to a request that is ordered at the home node later than the request issued by the requester 12. Since the snoop corresponds to a subsequent request, the requester 12 can place the snoop (or at least a portion of the snoop) in a corresponding queue and defer responding to the snoop until the request from the requester 12 has been completed.

Additionally, the home node 16 can employ the fill markers to control and manage when to send snoops from the home node for requests to the same line of data. The home node 16 can maintain transaction information associated with each request received for data. The home node 16 can employ the FM status information to control whether a given transaction is active or passive in the network 10. For example, the home node 16 can send the FM message in parallel with the corresponding snoop from the home node in response to the request from the requester 12. The home node 16 holds subsequent requests for the same line of data passive until the home node has confirmed that a previously sent fill marker message has been received at the requester 12, such as in response to the FM ACK message. After the FM ACK has been received for a prior transaction and after all responses have been received for all snoops, the next transaction can be transitioned to the active state. Once the next given transaction is placed in the active state, the home node 16 can send appropriate snoops in parallel with a FM message for the given transaction. By deferring subsequent snoops until confirming that the fill marker state information has been set for a preceding respective request, there typically will be at most two outstanding transactions in the network concurrently. Those skilled in the art will appreciate that the network 10 can implement suitable mechanisms to track or count requests to allow other numbers of outstanding transactions to exist concurrently in the network 10.

Figure 2:
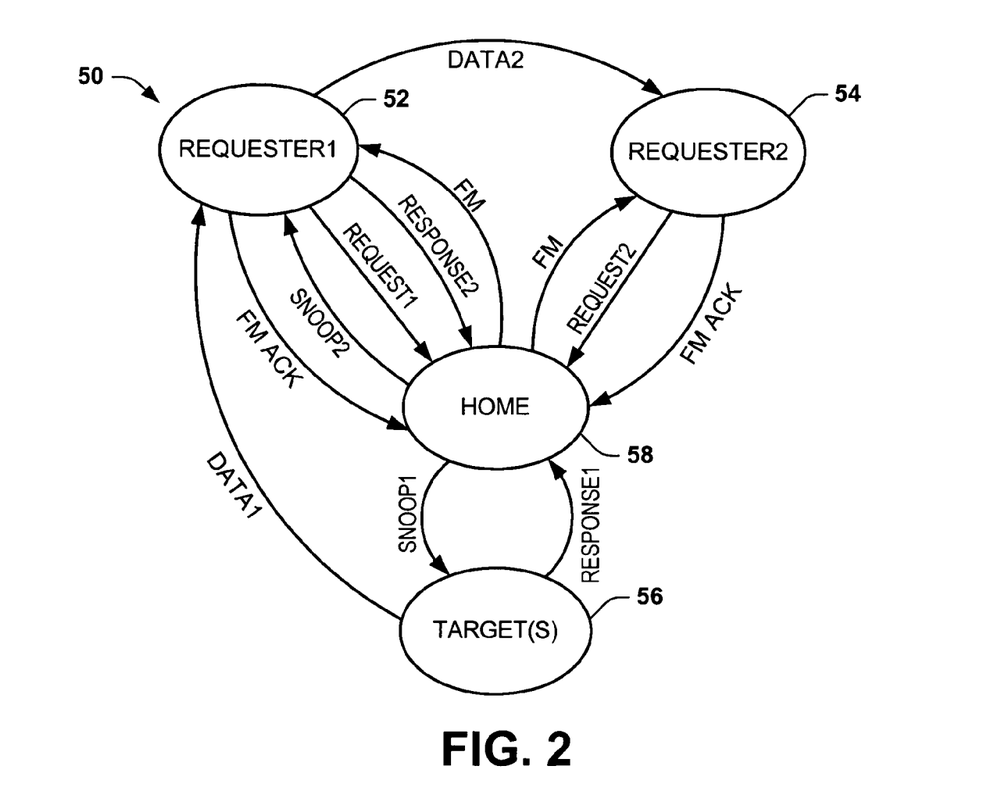
FIG. 2 depicts another example of a transaction being implemented in a multi-processor network.

As an additional example, FIG. 2 depicts a network 50 that includes a plurality of processor nodes 52, 54 and 56 and a home node 58. In the example of FIG. 2, the nodes 52 and 54 are each requesters for the same line of data, indicated at REQUESTER1 and REQUESTER2, respectively. Assume that REQUESTER1 52 provides a request (REQUEST1) that is received at the home node 58 prior to a second request (REQUEST2) from REQUESTER2 54; namely, REQUEST1 is ordered at the home node before REQUEST2. The home node 58 in turn provides a corresponding transaction reference or fill marker (FM) to REQUESTER1 52 in parallel with a corresponding snoop (SNOOP1) to the target node 56. Depending on the protocol being implemented, the home may also send SNOOP1 (not shown) to the REQUESTER2 54, which would return corresponding MISS to the home node 58 since REQUESTER2 54 has not received a FM message. REQUESTER1 52 sets a fill marker status bit in response to the FM message from the home node 58, and returns a corresponding FM ACK message back to the home node 58. The fill marker status bit at REQUESTER1 52 enables the requester to determine whether a subsequent snoop for the same data line precedes the REQUEST1 in the ordering implemented at the home node 58.

Since the home node 58 receives the REQUEST1 prior to REQUEST2, the home node defers sending a corresponding snoop for the REQUEST2 until the FM ACK message has been received from REQUESTER1 52. For example, the home node 58 can place the transaction for the REQUEST2 from REQUESTER2 54 on hold (e.g., in a passive state) until the home node 58 has confirmed that the fill marker message has been received and a corresponding FM ACK response has been provided by REQUESTER1 52. Additionally, the home node 58 can defer further processing of REQUEST2 until the home node has received corresponding responses to all snoops for the preceding REQUEST1. As mentioned above, the FM/FM ACK sequence serves as a handshaking process to confirm at the home node 58 that REQUESTER1 52 has set the fill marker status bit and thus can ascertain the ordering of transactions for the same data at the home node.

In the example of FIG. 2, it is assumed that the network 50 implements a queuing protocol in which a given requester 52, 54 can queue a snoop for a given line of data if the requester has an outstanding transaction for the same line of data when the snoop is received. In particular, the fill marker status bit enables a requester to ascertain whether the requester should respond to the snoop based on the present state of the data or whether the requester should queue the snoop and respond based on the state of the data after its outstanding transaction has been completed. For instance, if the fill marker status bit has not been set at the requester when a snoop is received, the requester will provide a response based on its current state of data since the snoop corresponds to an earlier ordered request at the home node 58. If the fill marker status bit is set at the requester when the snoop is received, the requester will queue the snoop and provide a response after the requester's transaction for the data has been completed. In the latter example, the fill marker status bit enables the requester to determine that the snoop was associated with a request later in order at the home node 58. That is, while the fill marker status bit is set at the requester, the protocol ensures that every snoop to the same line of data at the requester has a subsequent place in ordering at the home node and thus should be queued for deferred processing.

Continuing with the example of FIG. 2, assuming the target node 56 is an owner of the data requested by REQUESTER1 52, the target node 56 provides a corresponding data response (indicated at DATA1) to REQUESTER1 52. The target node 56 also provides a corresponding response (RESPONSE1) to the SNOOP1 request to the home node 58. RESPONSE1 informs the home node 58 that the target node 56 has responded with data. Each other target node (if any) receiving the SNOOP1 request can also respond to the home node. The extent of information in RESPONSE1 and the action taken at the home node 58 to the response can vary according to the particular protocol being implemented in the network 50. After receiving RESPONSE1 from the target node 56 and any other expected responses for other target nodes, the home node 58 can retire a transaction entry associated with REQUEST1 from REQUESTER1 52.

Assuming that the home node 58 receives the REQUEST2 from REQUESTER2 54 after REQUEST1, the home node defers issuing a second snoop (SNOOP2) until after the FM ACK message has been received from REQUESTER1 52 and snoop responses (RESPONSE1) have been received. The home node 58 provides the SNOOP2 to at least REQUESTER1 52. In parallel with SNOOP2, the home node 58 also provides a FM message to REQUESTER2 54. REQUESTER2 54 sets a corresponding fill marker field at REQUESTER2 and returns a FM ACK message back to the home node 58 in response to the FM message. Assuming that REQUESTER1 52 has the associated fill marker flag set and REQUEST1 is still pending when SNOOP2 is received from the home node 58, REQUESTER1 places the SNOOP2 request (associated with REQUEST2 from REQUESTER2 54) in a corresponding queue. That is, REQUESTER1 "knows" that REQUEST1 precedes REQUEST2 at the home node 58 since the fill marker flag at REQUESTER1 52 is set when SNOOP2 is received.

REQUESTER1 52 can complete the pending transaction associated with REQUEST1 in response to receiving the DATA1 response from the target node 56. REQUESTER1 52 can also implement appropriate maintenance functions (e.g., state changes and writing data to the appropriate cache line). After performing such maintenance functions, REQUESTER1 52 can respond to the queued SNOOP2 request from the home node 58. In particular, REQUESTER1 52 provides a data response (indicated at DATA2) to REQUESTER2 54 as well as provides a corresponding RESPONSE2 to the SNOOP2 request. The home node 58 can then retire the transaction associated with the REQUEST2.

Those skilled in the art will understand and appreciate that the approach described with respect to FIG. 2 can be implemented, for example, in a directory-based as well as a null-directory protocol that employs queuing at a source processor that has an outstanding request. In the example of a null-directory protocol, the home node 58 will snoop each other node as target nodes in the network 50 in a response to a request from a given requester. Each of the targets nodes will provide a corresponding response to the home node 58, with the owner node (if any) providing a data response to the requester. In a directory-based protocol, the home node 58 will issue snoops for only a selected subset of request types and generally will snoop only an identified owner node based on directory state information maintained at the home node. Alternatively, the directory-based protocol can be implemented to require that the home node issue fill marker messages associated with each request.

Figure 3:
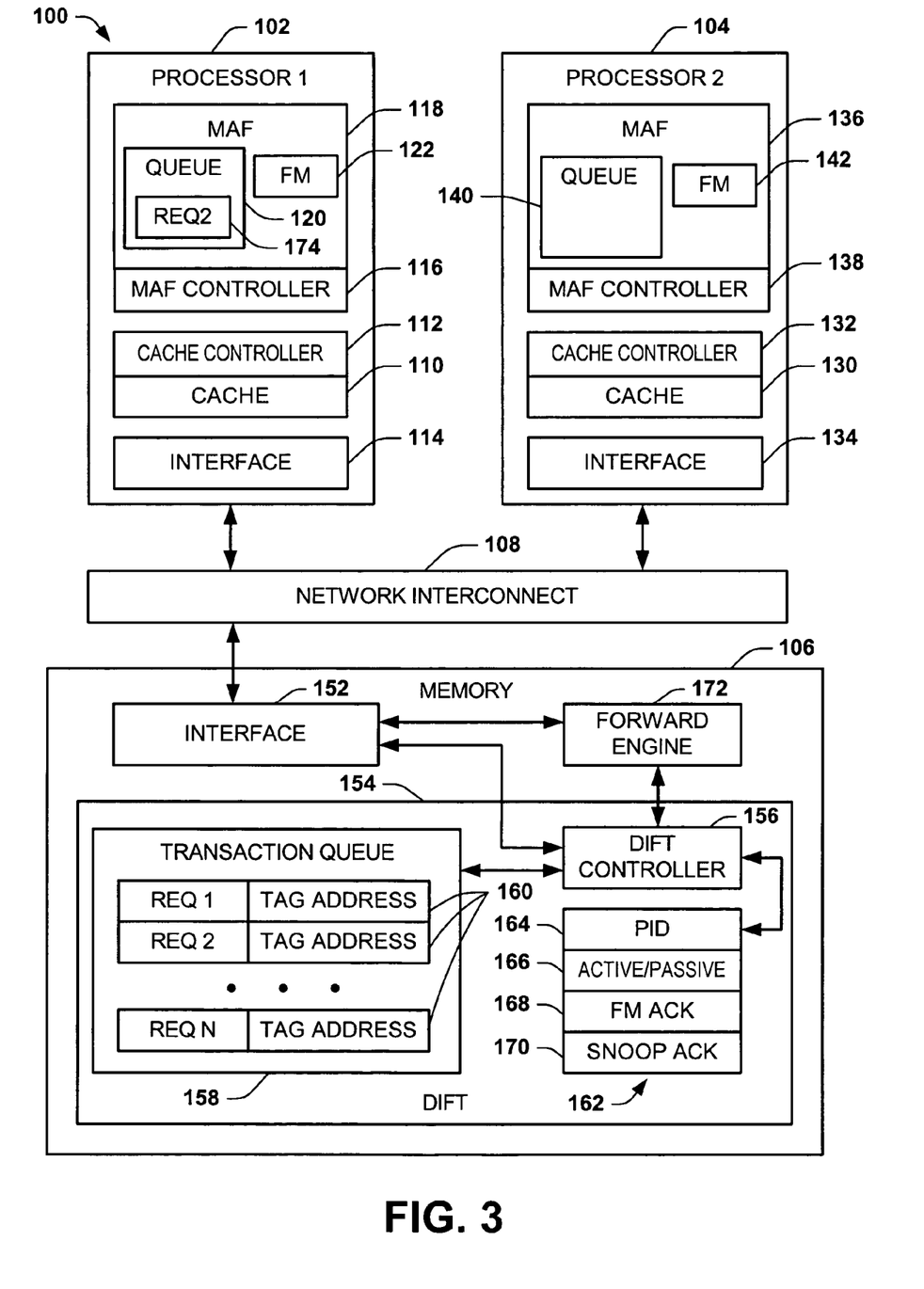
FIG. 3 depicts an example of a multi-processor network.

FIG. 3 depicts an example of multi-processor system 100 that includes a plurality of processors 102 and 104 and shared memory 106. Each of the processors 102 and 104 and the memory 106 define a respective node in the system 100 that communicates via a network interconnect 108. For example, the interconnect 108 can be implemented as a switch fabric or hierarchical switch programmed and/or configured to manage transferring requests and responses between the processors 102 and 104 and the memory 106, as well as those to and from other nodes (not shown). Those skilled in the art will understand and appreciate that any number of processors can be implemented in the system 100, although for purposes of brevity only two processors 102 and 104 are depicted in FIG. 3.

In the example of FIG. 3, it is assumed that the system 100 employs a null-directory protocol. In a null-directory-based protocol, the memory 106 corresponds to a shared memory structure in the system 100 and defines a home node. The home node operates as a static ordering point that serializes requests for data. The home node, for example, receives a request (e.g., on a virtual request channel) from a source node via the interconnect 108. The home node then snoops (e.g., on a virtual forward channel) the other nodes in the system 100 for a coherent copy of the requested data according to the ordering maintained at the home node. The example of FIG. 3 assumes that the system 100 employs unordered channels such that messages can arrive at respective destinations in different orders than the order in which the messages were transmitted. The target nodes respond to the snoops (e.g., on a virtual response channel), one of which responses may include a copy of the requested data.

The processor 102 includes a cache 110 that contains a plurality of cache lines for storing data required by the processor 102. Each cache line contains data that includes one or more memory blocks. A tag address is associated with the data contained in each cache line. Each cache line can also contain state information identifying the state of the data contained at that cache line. For example, the network 100 can employ a "MESI" null-directory cache coherency protocol having states for cache data, such as identified below in Table 1.

TABLE 1

| STATE | DESCRIPTION |
|---|---|
| I | Invalid - The cache line does not exist. |
| S | Shared - The cache line is valid and unmodified by the caching processor. Other processors may have valid copies, and the caching processor cannot respond to snoops by returning data. |
| E | Exclusive - The cache line is valid and unmodified by the caching processor. The caching processor has the only cached copy in the system. The caching processor responds to forward requests by returning data. |
| M | Modified - The cache line is valid and has been modified by the caching processor. The caching processor has the only cached copy in the system. The caching processor responds to forward requests by returning data and writes data back to memory upon displacement. |

A cache controller 112 is associated with the cache 110. The cache controller 112 controls and manages access to the cache 110, including requests for cached data, forwarding copies of cached data to other nodes, and providing responses to requests from other nodes. The cache controller 112 communicates requests, forwards, and responses to the network 100 via an interface 114 that is coupled with the network interconnect 108. The interface 114, for example, includes an arrangement of queues (e.g., input and output queues) or other data structures operative to organize requests, forwards, and responses issued by the processor 102, as well as manage requests, forwards, and responses provided to the processor for execution.

The cache controller 112 is also operative to control the state of each respective line in the cache 110. For example, the cache controller 112 is programmed and/or configured to implement state transitions for the cache lines based on predefined rules established by the null-directory protocol implemented in the network 110. For example, the cache controller 112 can modify the state of a given cache line based on requests issued by the processor 102. Additionally, the cache controller 112 can modify the state of a given cache line based on responses, forwards, or requests associated with the given cache line. The responses, forwards, or requests can be provided to the processor 102, for example, by another processor 104 and/or the memory 106.

The processor 102 also includes a miss address file (MAF) controller 116 that manages a MAF 118. The MAF 118 can be implemented as a table, an array, a linked list, or other data structure programmed to manage and track transactions for respective cache lines in the cache 110. The MAF 118 contains entries for a selected subset of the cache lines of the cache 110, such as an entry for each outstanding request for data issued by the processor 102. The MAF controller 116 employs the MAF 118 to manage requests issued by the processor 102, as well as responses or forwards associated with such requests.

For example, when the processor 102 implements a request for data associated with a given address line, the MAE controller 116 allocates a corresponding entry for the request in the MAF 118. Typically, a MAF entry is pending in the MAF 118 until the corresponding transaction has been completed. The MAF entry can collect responses from other processors 104 and from the memory 108, maintain state and other information in data fields for the entry associated with pending transactions at the processor 102. The MAF entry can also interface with the cache controller 112 to manage coherent data received for the request.

The MAF 118 also includes a queue 120 for storing requests for data when the processor 102 has an outstanding transaction pending for the same data. In the null-directory protocol, for example, the processor 102 receives a request in the forward channel, such as a snoop (or probe) from the home node at the memory 106, such as corresponding to a request from another processor 104 in the system 100. When the processor 102 receives the snoop for data while the MAF 118 has an outstanding MAF entry for the same data, the MAF controller 116 can place the request in the queue 120 for deferred processing.

The protocol implemented in the network 100 also employs a transaction reference, namely, a fill marker status field (e.g., a FM status bit) 122 to determine whether the snoop will be placed in the queue 120. The fill marker field 122 enables the processor 102 to determine a serialization order for data requests at the home node. In the example of FIG. 3, the MAF controller 116 is operative to set the fill marker (FM) status field 122 to identify a serialization or ordering point at the home node associated with a request issued by the processor 102 for a given line of data. A fill marker field can be associated with each MAF entry, such that if the fill marker field is set, the MAF controller 116 will place requests for data associated with the MAF entry in the respective queue 120. When the processor 102 receives coherent data, the MAF controller 116 cooperates with the cache controller 112 to fill the data into the cache 110, and to write the cache tags to the appropriate state. After the pending transaction associated with the MAF entry has been completed, the MAF controller 116 can cooperate with the cache controller 112 to process the queued request and provide an appropriate response based on version of the data in the cache 110.

The processor 104 can be substantially similar to the processor 102. Briefly stated, the processor 104 includes a cache 130 and a cache controller 132 associated with the cache. The cache controller 132 controls and manages access to the data stored in cache lines of the cache 130. The processor 104 includes an interface 134 that is coupled for communicating messages to the system 100 via the network interconnect 108. The cache controller 132 is also operative to control the state of each respective line in the cache 130, such as based on responses, forwards, or requests associated with the tag address for a respective cache line.

The processor 104 also includes a MAF 136 and an associated MAF controller 138. The MAF 136 contains entries for a selected subset of the cache lines of the cache 130, such as an entry for outstanding requests issued by the processor 104. Each entry in the MAF 136 includes fields associated with a request or command for a given line of data. The MAF controller 136 employs entries in the MAF 136 to manage requests issued by the processor 104, as well as responses or forwards to such requests.

The MAF 136 also includes a queue 140 for storing requests for data when the processor 104 has a transaction pending for the same data. Each entry in the MAF 136 can also include a fill marker field (e.g., a status bit) 142 that enables the processor 104 to determine a serialization order for data requests at the home node. The MAF controller 138 controls queuing of snoops (forward requests) based on the state of the fill marker field 142. That is, the fill marker field 142 determines whether a snoop received from the home node for the same data will be placed in the queue 140 for deferred processing or, alternatively, whether the processor will respond based on the present version of data when the request is received.

The memory 106 includes an interface 152 to enable communications through the network interconnect 108. For example, the interface 152 can include an arrangement of one or more input queues configured to receive requests or other transactions via the network interconnect 108, such as from the processors 102 and 104. Additionally, the interface 152 can include one or more output queues operative to transmit requests, forwards or responses via the network interface 108 as data packets to the processors 102 and 104. Also associated with the memory 106 is a structure that manages an order of requests to the same cache line. An example of such a structure is a directory-in-flight table (DIFT) 154, although other structures could also be utilized. In the null-directory protocol implemented in the network 100, a DIFT controller 156 receives requests and responses from the network 100 via the interface 152. The DIFT controller 156 populates a transaction queue (e.g., an in-order queue) 158 of the DIFT 154 with pending transactions corresponding to requests and other command types that have been provided to the home node in the memory 106.

For example, the transaction queue 158 can contain a plurality of transactions 160 for requests and other commands. Each of the transactions can include a transaction identifier (indicated at REQ 1 through REQ N, where N is a positive integer denoting the number of pending transactions). Each transaction also includes a corresponding tag address associated with a respective line of data. The transaction queue 158 can be implemented as a content addressable memory (CAM) structure in which the tag address for a given line of data operates as a search field. The DIFT controller 156 thus can employ the tag address provided in a request as an input to the CAM to match the request with other pending transactions already placed in the transaction queue 158 for the same line of data.

Transaction control fields 162 are associated with each transaction 160 in the transaction queue 158. As an abbreviated example, the transaction control fields 162 can include a source processor identifier (PID) field 164, an ACTIVE/PASSIVE field 166, a fill marker acknowledgement (FM ACK) field, and a snoop acknowledgement field 170. The PID field identifies the source processor for each respective transaction 160. The ACTIVE/PASSIVE field 166 identifies the status of the associated transaction. In the example of FIG. 3, a home node will defer processing and sending snoops to the system 100 for a transaction until the ACTIVE/PASSIVE field 166 has been set to the active state for a respective transaction 160. The FM ACK field 168 is set in response to receiving a FM ACK message from the source processor. The SNOOP ACK field 170 provides an indication as to whether the home node has received responses to all snoops sent out to the system 100 for a given transaction. After the FM ACK and all snoops have received responses (e.g., all snoops are done), the DIFT controller 156 can retire the respective transaction 160 and activate a next transaction for the same line of data. Those skilled in the art will understand and appreciate other fields that may be utilized for managing transactions in the DIFT 154.

By way of example, assume that the processor 102 requires a block of data not contained locally in the cache 110 (e.g., a cache miss). Accordingly, the processor 102 (as a source processor) employs the MAF controller 116 to allocate a corresponding entry in the MAF 118. The MAF controller 116 employs the MAF entry to issue a corresponding request (e.g., in a request channel) to the home node of the memory 106. The memory 106 receives the request at the interface 152 via the network interconnect 108 and the DIFT controller 156 places the request in the transaction queue 158 (e.g., as REQ1). The tag address in the received request is employed to determine whether any additional requests for the same line of data exist in the transaction queue 158 of the DIFT 154 (e.g., by CAM look-up).

Assuming that no prior transactions exist in the transaction queue 158 for the same line of data, the DIFT controller 156 employ a forward engine 172 to issue a corresponding snoop to the system 100 via the interface 152 and the network interconnect 108. The forward engine 172 issues the snoops to the other processors (the processor 104) in the system 100 according to the null-directory protocol. In parallel with the snoop, the forward engine 172 also provides a FM message to the source processor 102 via the interface 152 and the network interconnect 108, such as based on the PID field 164 associated with the received request. As described herein, the fill marker provides a transaction reference that enables the source processor 102 to determine an order of transactions pending at the home node relative to the request provided by the source processor.

The MAF controller 116 employs the fill marker message from the home node to set a corresponding FM status field 122 (e.g., FM=1) in the MAF entry associated with the request. The MAF controller 116 also returns a FM acknowledgement (FM ACK) message back to the home node in the memory 106. The DIFT controller 156 receives the FM ACK message and sets the corresponding FM ACK status field 168 accordingly. The DIFT controller 156 also receives responses via the interface 152 to each snoop provided by the forward engine 172. The transaction 160 associated with the request (REQ1) from the source processor 102 can remain pending in the DIFT 154 until the complete set of responses have been received for the set of snoops provided by the forward engine 172 to the other nodes in the system 100. For example, the DIFT controller 156 can employ a snoop counter (not shown) to set the SNOOP ACK field 170 after the number of snoop responses received from the system 100 equals the number of snoops sent to the system. After all snoop responses have been received and the SNOOP ACK field 170 has been set and after the FM ACK status field has been set for the transaction 160, the DIFT controller 156 can set the ACTIVE/PASSIVE field 166 to the active state for a subsequent transaction for the same line of data. Once in the active state, the DIFT controller 156 can employ the forward engine 172 to send snoops to the system for the subsequent transaction. The DIFT controller 156 can also retire corresponding completed transaction 160 from the DIFT 154 for the request from the processor 102.

By way of further example, in FIG. 3, it is assumed that the processor 104 requires a copy of the same line of data (e.g., having the same tag address) as the pending request (REQ1) provided by the processor 102. The processor 104 thus provides a request (REQ2) to the home node in the memory 106, such that the DIFT controller 156 places the request (REQ2) in the transaction queue 158. At this point it is assumed that the FM ACK field 168 associated with the request (REQ1) from the processor 102 has already been set and the set of snoop responses has been received. The DIFT controller 156 can set the SNOOP ACK field 170 associated with the respective transaction 160 after the complete set of snoop responses has been received for the request (REQ1).

The DIFT controller 156 can set the ACTIVE/PASSIVE field 166 for the request (REQ2) to the active state based on the FM ACK field 168 and the SNOOP ACK field 170 for the preceding request (REQ1) in the transaction queue 158. Once the transaction 164 associated with REQ2 is set to the active state, the DIFT controller 156 employs the forward engine 172 to snoop the system 100 for the requested data. In parallel with the snoops, the forward engine 172 also sends a FM message to the processor 104. The MAF controller 138 sets the FM status field 142 and responds with a corresponding FM ACK message.

In the example of FIG. 3, it is assumed that the processor 102 receives the snoop from the home node associated with the request (REQ2) from the processor 104 while the FM field 122 is set. For instance, the MAF controller 116 examines the tag address for the snoop and determines that the processor 102 has an outstanding MAF entry for the same tag address. Since in this example, the FM status field 122 is set (e.g., FM=1), it is known that the snoop corresponds to a request that is later in order at the home node than the request (REQ1) issued by the processor 102. In response to the FM status field 122 being set, the MAF controller 116 places the snoop in the queue 120, indicated at (REQ2) 174. The MAF controller 116 will cooperate with the cache controller 112 to respond to the queued request (REQ2) 174 after the pending request (REQ1) at the processor 102 has been completed. As a result, the processor 102 can respond to snoops for subsequently ordered requests based on state of the data stored in the cache 110 after receiving responses to the preceding request (REQ1) issued by the processor 102.

Assuming that the home node or another node has provided coherent data to the processor 102 to complete the request (REQ1) at the processor, the processor can proceed with responding to the queued request 174. At the DIFT 154, responses to the snoops for the request (REQ1) from the processor 102 are received. For example, the cache controller 112 can retrieve a cached copy of the requested data from the cache 110 and provide a corresponding data response to the processor 104 via the interface 114 and the network interconnect 108. The cache controller 114 may also provide a corresponding acknowledgement message to the home node in response to the snoop request from the forward engine 172. The DIFT controller 156 can track other responses to the snoops associated with the request (REQ2) from the processor 104 and after the transaction has been completed, retire the entry in the DIFT 154.

Figure 4:
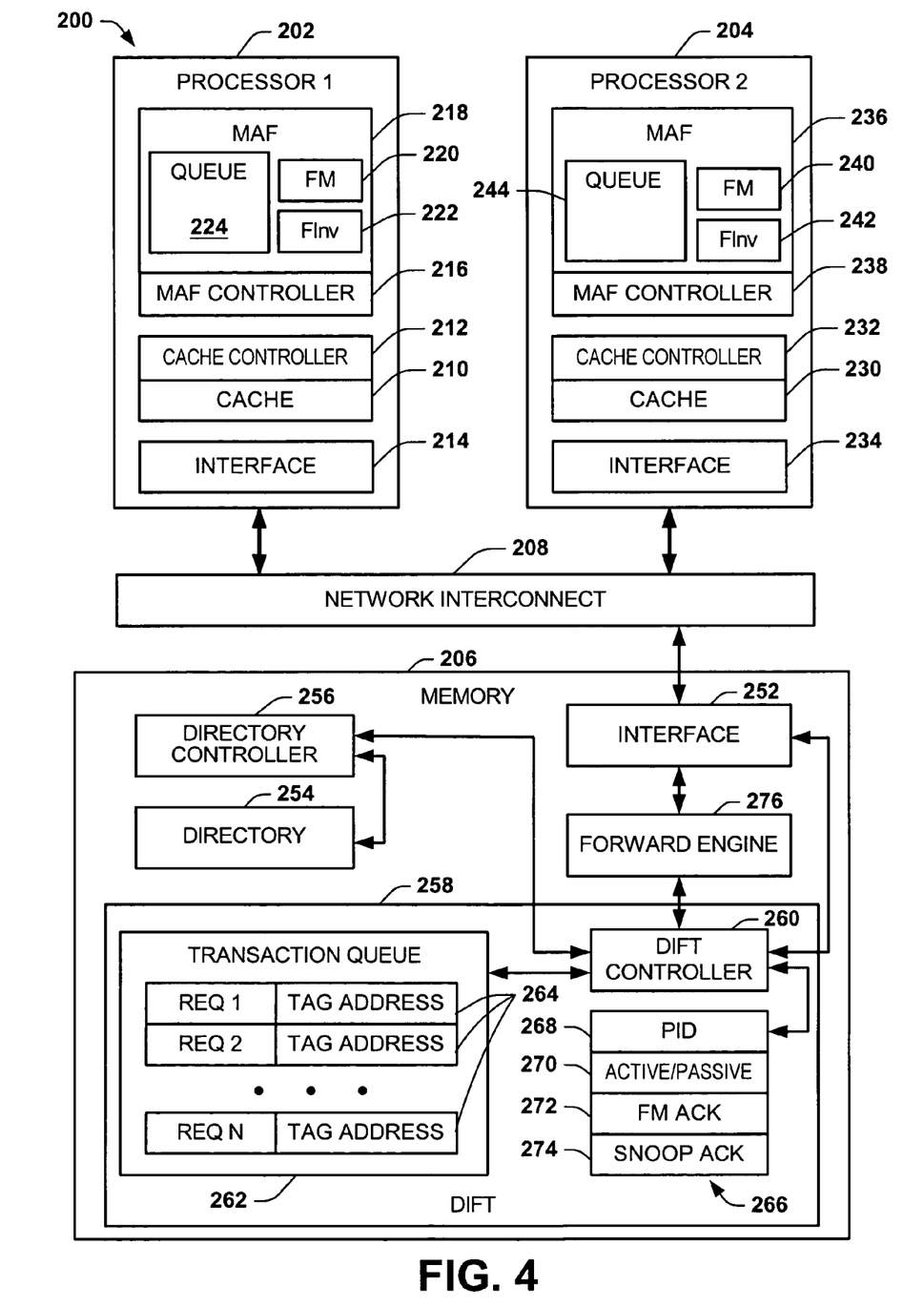
FIG. 4 depicts an example of another multi-processor network employing a directory-based coherency protocol.

FIG. 4 depicts an example of another multi-processor system 200. The system 200 includes a plurality of processors 202 and 204 and a shared memory 206 that defines nodes within the system. The system 200 is similarly configured to the system 100 shown and described with respect to FIG. 3, although the system employs a directory-based cache coherency protocol. The system 200 utilizes fill markers to facilitate ordering (or serializing) transactions at a home node and at requester nodes, such as the processors 202 and 204. The processors 202 and 204 and the memory 206 communicate via a network interconnect (e.g., a switch fabric or hierarchical switch) 208. Those skilled in the art will understand and appreciate that any number of processors can be implemented in the system 200.

The processor 202 includes a cache 210 that contains a plurality of cache lines for storing data required by the processor 202. A tag address and state information are associated with data contained in each cache line. For example, the network 200 can employ a "MESI" directory-based cache coherency protocol having states for cache data (See, e.g., Table 1), which state information is also maintained in the home node of the memory 206 for each line of data. A cache controller 212 controls and manages access to the cache 210. The cache controller 212 communicates requests, forwards, and responses to other nodes in network 200 via a switch interface 214 that is coupled with the network interconnect 208. The cache controller 212 is also operative to control the state of each respective line in the cache 210 based on predefined rules established by the directory-based protocol implemented in the system 200. For example, the cache controller 212 can modify the state of a given cache line based on requests issued by the processor 202 as well as based on responses, forwards, or requests received by the processor. The responses, forwards, or requests can be provided to the processor 202, for example, by another processor 204 and/or the memory 206.

The processor 202 also includes MAF controller 216 that manages an associated MAF 218. The MAF 218 contains entries for a selected subset of the cache lines of the cache 210, such as an entry for each outstanding request for data issued by the processor 202. For example, the MAF controller 216 allocates a corresponding entry in the MAF 218 when required data is not available locally from the cache 210. The MAF controller 216 can collect responses from other processors 204 and from the memory 208 associated with each MAF entry as well as maintain associated state and other information for each respective MAF entry for transactions pending at the processor 202. The MAF controller 216 can also cooperate with the cache controller 212 to fill data to the cache 210 when data is received for the request.

Each MAF entry can include associated transaction status fields, including, for example, a fill marker status (FM) field 220 and a fill invalid status (FInv) field 222. The MAF controller 216 sets the FM field 220 in response to a FM message from the home node for a tag address associated with a MAF entry in the MAF 218. The home node provides the FM message (e.g., in a virtual forward channel) to the processor 202 in response to a request for data issued by the processor. The processor 202 can determine a serialization order at the home node for snoop requests for a given line of data issued by the home node based on whether the associated FM field 218 is set.

The MAF controller 216 can set the FInv field 222 for a given MAF entry in response to receiving an invalidate command from the home node while the FM field is not set and an expected data response has not yet been received (e.g., a MAF entry is still outstanding). If the FInv field is set, the MAF controller 216 enables data from a data response to be written to a local register (not shown) to afford a single use of the data. The cache controller 212, however, writes the data to the register and transitions the cache line to the I-state. Accordingly, if the processor 202 requires the data for further use, the processor will need to allocate another MAF entry and issue a corresponding request for the data.

The MAF 218 also includes a queue 224 for storing requests for subsequent processing when the processor 202 has an outstanding transaction pending for the same data. For example, the processor 202 receives a request in the virtual forward channel, such as a snoop (or other request) from the home node at the memory 206 (corresponding to a request from another processor 204). When the processor 202 receives the snoop or other request from the home node for data while the MAF 218 has an outstanding MAF entry for the same data, the MAF controller 216 can place the request in the queue 224 if the FM field 220 has been set. This is because when the FM field 220 is set, requests to the same line of data were received and are ordered at the home node after the pending request at the processor 202. If the FM field 220 has not been set, the MAF controller 216 can cooperate with the cache controller 212 to respond based on the present state of data in the cache 210 when the request is received.

The processor 204 can be substantially similar to the processor 202. Briefly stated, includes a cache 230 and a cache controller 232 associated with the cache. The cache controller 232 controls and manages access to the data stored in cache lines of the cache 230. The processor 204 includes a switch interface 234 that is coupled for communicating messages to the system 200 via the network interconnect 208. The cache controller 232 is also operative to control the state of each respective line in the cache 230, such as based on responses, forwards, or requests associated with the tag address for a respective cache line.

The processor 204 also includes a MAF 236 and an associated MAF controller 238. The MAF 236 contains entries for a selected subset of the cache lines of the cache 230, such as an entry for each outstanding request issued by the processor 204 that results in a local cache miss. Each entry in the MAF 236 includes fields associated with a request or command for a given line of data. The fields can include, among other fields, a FM field 240 and a FInv field 242. As described with respect to the MAF 218, the FM field 240 enables the processor 204 to determine a relative serialization order for requests to a given line of data at the home node. If the processor 204 receives a request for a given line of data while the FM field is set, the MAF controller 238 places the request in a queue 244. The placement of the request in the queue 244 defers processing of the request since the fill marker status indicates that the request is for a later version of the data than the presently cached version. The processor 204 will respond to the queued request after the transaction associated with the MAF entry has been completed.

The FInv field 242 provides a mechanism to allow a single use of data even when the respective cache line in the cache 230 has been invalidated by a subsequently ordered transaction and the FM field has not been set. The MAF controller 238 can set the FInv field 242 in response to receiving an invalidate command if the FM field is not set for an outstanding MAF entry in the MAF 236. If the FInv field 242 is set and a data response is received, the processor 204 can place the data in a register for a single use. The cache controller 232 will transition the corresponding cache line to an invalid state, such that the processor cannot further utilize the cached data.

As mentioned above, the MAF controller 238 employs the queue 244 to store requests for data when the processor 204 has a transaction pending for the same data. The MAF controller 238 controls queuing of snoops (forward requests) based on the state of the FM field 240 when the snoop or other forward request is received. That is, the MAF controller 238 determines, based on the FM field 240, whether a request received from the home node for the same data will be placed in the queue 244 for deferred processing or whether the processor can respond based on the present state of the data in the cache 230.

The memory 206 includes an interface 252 to enable communications through the network interconnect 208. In the directory-based protocol implemented in the network 200, the memory 206 includes a directory 254 and a directory controller 256. The directory 254 contains directory state information associated with a plurality of memory lines. The directory controller 256 manages the information maintained at the directory 254, including modifying the directory state information and providing the information to an associated transaction management resource, indicated in FIG. 4 as a DIFT 258. Those skilled in the art will appreciate various types of structures that can be employed to manage transactions at a home node.

The DIFT 258 includes a DIFT controller 260 that manages requests and other command types received via the interface 252. In response to receiving a request or other command type, the DIFT controller 260 cooperates with the directory controller 256 to perform a look-up in the directory 256 to ascertain pertinent information associated with data identified in the request. The information, for example, can include state information as well as the location of an owner node (if any) for the requested data. The DIFT controller 260 also allocates an entry in the DIFT 258 associated with the request, such as in a corresponding transaction queue (or other structure) 262. The transaction queue 262, for example, maintains an ordered list of transactions 264 being processed at the DIFT 258. A plurality of transaction fields 266 can be associated with each transaction 264 for providing control and status information for each respective transaction.

Transaction control fields 266, for example, can include a source processor identifier (PID) field 268, an ACTIVE/PASSIVE field 270, a fill marker acknowledgement (FM ACK) field 272, and a snoop acknowledgement (SNOOP ACK) field 274. The PID field 268 identifies the source processor for each respective transaction 264. The ACTIVE/PASSIVE field 270 identifies the status of the associated transaction. In the example of FIG. 4, the home node will defer processing and sending snoops or certain types of requests (e.g., invalidate commands in response to a write request) to the system 200 for a transaction until the DIFT controller 260 has set the ACTIVE/PASSIVE field 270 a respective transaction 264. Those skilled in the art will understand and appreciate other fields that may be utilized for managing transactions in the DIFT 258.

The DIFT controller 260 can transition a pending transaction in the transaction queue 262 to the ACTIVE state (e.g., by setting the ACTIVE/PASSIVE field 270) after receiving both the FM-ACK message and responses to any other outstanding snoops for the preceding (e.g., earlier ordered) request in the transaction queue. As an example, the DIFT controller 260 can set the FM ACK field 272 for the preceding request in response to receiving a FM ACK message from the source processor. The SNOOP ACK field 274 provides an indication as to whether the home node has received responses to all snoops sent out to the system 200 for a given transaction (e.g., whether all snoops are done). After all snoops have received responses, the transaction is considered complete, and the DIFT controller 260 can set the SNOOP ACK field 274 and retire the respective transaction 264. The DIFT controller 260 then sets the ACTIVE/PASSIVE field 270 for the next transaction for the same line of data (e.g., having the same tag address), and processing can begin at the home node in the memory 206 for such transaction.

In the system 200 employing a directory-based protocol, the DIFT controller 260 can request directory state information from the directory controller 256 and employ location information to identify one or more target nodes to which a forward request or snoop request should be sent. Assuming that the state information in the directory 254 indicates that an exclusive cached copy of the requested data exits at an owner node (e.g., in the M or E-state), the DIFT controller 260 employs a forward engine 276 to provide a corresponding forward channel request to the owner node.

By way of further example, assume that the processor 202 requires a block of data not contained locally in the cache 210 (e.g., a cache miss). Accordingly, the processor 202 (as a source processor) employs the MAF controller 216 to allocate a corresponding entry in the MAF 218. The MAF controller 216 issues a corresponding request (e.g., in a request channel) to the home node in the memory 206 via the interface 214 and the network interconnect 208. The memory 206 receives the request at the interface 252 and the DIFT controller 276 places the request (REQ1) in the transaction queue 262. The DIFT controller 260 also cooperates with the directory controller 256 to perform a look-up in the directory 254 for state information associated with the tag address in the request. Assuming that the requested line of data is cached at an owner processor node in the system 200, the directory controller 256 provides corresponding state and processor location (e.g., PID) information to the DIFT controller 260.

The DIFT controller also employs the tag address in the request to determine whether other requests 264 exist in the transaction queue 262 for the same line of data. Assuming that no prior transactions exist in the transaction queue 262 for the same line of data and the data is cached in another processor, the DIFT controller 260 employs the forward engine 276 to issue a corresponding forward request to the system 200 via the interface 252 and the network interconnect 208. The type of forward request or command that the forward engine sends will vary depending on the type of request issued by the processor 202 and the state of the cached data. For instance, for a general read request from the processor 202, the forward engine 276 may send a forward read request to the processor node that contains the cached copy. Alternatively, for a write request as well as for other selected requests, the forward engine 276 can issue a snoop command or request, such as an invalidate command, to a plurality of other nodes in the system 200 that contain valid cached copies (e.g., in the S, M or E-state).

The forward engine 276 provides a FM message to the source processor 202 in parallel with the snoop(s) issued for the requested data. The forward engine 276, for example, provides the FM message to the processor 202 in the forward channel via the interface 252 and the network interconnect 208, such as based on the PID field 268 associated with the received request. As described herein, the fill marker message enables the source processor 202 to determine an order of transactions pending at the home node relative to the request provided by the source processor. As an optimization to improve throughput at the home node, if the request from the source processor 202 is a read request that does not require the home node to issue snoops to the other nodes in the system, the DIFT controller 260 does not cause the FM message to be sent to the source processor. That is, fill markers are not required in situations when snoops are not sent to the system 200 since the directory-based protocol can ensure proper ordering of requests to the requested line of data at the home node. In one implementation, a FM message (and corresponding acknowledgment) is utilized for all write requests. Because the system 200 is implemented as an unordered network, orders of requests and other messages can become ambiguous since the arrival of different messages is not guaranteed by the network interconnect 208.

When the FM message is sent to the source processor 202, the MAF controller 216 employs the FM message to set the corresponding FM status field 220 (e.g., FM=1). The MAF controller 216 also returns a FM acknowledgement (FM ACK) message back to the home node in the memory 206. The DIFT controller 260 receives the FM ACK message and sets the corresponding FM ACK status field 272 accordingly. After the FM ACK status field 272 has been set for the transaction 264 and after requisite responses have been received to set the SNOOP ACK field 274, the DIFT controller 260 can set the ACTIVE/PASSIVE field 270 to the active state for a subsequently ordered transaction for the same line of data. Once a transaction 264 is in the active state, the DIFT controller 260 can employ the forward engine 276 to send snoop(s) to the system. For those requests that do not require the use of fill markers, the DIFT controller 260 can set a subsequent transaction to the active state after prior transactions to the same line of data have been completed.

Assume further that the processor 204 requires a copy of the same line of data (e.g., having the same tag address) as the pending request (REQ1) provided by the processor 202 and that the fill marker field 220 has been set in response to a FM message from the home node at the memory 206. The processor 204 provides a request (REQ2) to the home node in the memory 206, such that the DIFT controller 260 places the request (REQ2) in the transaction queue 264. The DIFT controller 260 controls ordering of the request (REQ2) from the processor 204 based on the FM ACK field 272 and the SNOOP ACK field 274 associated with the request (REQ1) from the processor 202. After the requisite condition(s) associated with the preceding request (REQ1) have been met, the DIFT controller 260 employs the forward engine 276 to issue a corresponding snoop (e.g., in a virtual forward channel) for the requested data. As mentioned above, the type of snoop issued in response to the request (REQ2) from the processor 204 will vary depending on the request from the processor and the directory state information associated with the requested data.

Assuming that the directory state information indicates that the requested data is cached at the processor 202, the DIFT controller 260 employs the forward engine 276 to request the data from the processor 202. The forward engine 276 also sends a FM message to the processor 204 in parallel with the snoop request. If the processor 202 receives the request from the home node associated with the request (REQ2) from the processor 204 while the FM field 220 is set, the MAF controller 216 places the request in the queue 224 for a deferred response. If the FM field is not set or after the corresponding MAF entry has been retired (in response to receiving and caching the data), the cache controller 212 can issue a corresponding response to the processor 204 and to the home node based on the state of the cached data when the snoop is received. The DIFT controller 260 and directory controller 256 cooperate to update the transaction data and directory state information based on the response provided by the processor 202.

As described herein, it is possible that a command, such as an invalidate command, can reach the processor 202 before the processor receives a copy requested data from the memory 206 and when the FM field 220 is not set (e.g., FM=null). For instance, if the directory state information in the directory 254 indicates that no cached copy exists in the system 200, the memory 206 can directly provide a copy of the requested data to the processor 202 in response to the request (REQ1), with the directory state information being updated to identify the processor as having a shared copy of the data. While the corresponding MAF entry is outstanding, but before the data has been filled in the cache 210, the DIFT controller 260 can provide an invalidate command to the processor 202 and to other nodes (not shown) in the system 200 determined to have a valid copy of the data. Since the system 200 comprises an unordered network, the invalidate command can reach the processor 202 prior to the data from the memory 206.

The system thus employs a fill-invalid process to mitigate deadlocking that might occur in the above example. For instance, the MAF controller 216 sets the FInv field 222 for the outstanding MAF entry in response to receiving an invalidate command since the FM field has not been set. After the FInv field 222 is set, the MAF controller 216 affords the processor 202 a single use of the data received from the memory 206 and the cache controller transitions the cache line in the cache 210 to the I-state. If the processor 202 requires the data after the allowed single use, the processor will need to allocate another MAF entry and issue another request for the data.

In view of the foregoing, those skilled in the art will appreciate that the use of fill markers facilitates making forward progress even though the system 200 employs unordered channels. As described herein, fill markers provide a requesting processor node a means (e.g., a handshaking sequence) for disambiguating whether a snoop that the requesting processor node receives was ordered at the home node before or after the requesting processor's own outstanding request. Typically, snoops that were ordered at the home node before an outstanding request at the requester will receive a miss response since the snoops apply to a different version of data than the version of the data being requested by the requesting processor. In contrast, snoops that were ordered at the home node after the outstanding request from the requesting processor will be queued for a deferred response after the requesting processor's request has been completed.

The fill-invalid field operates to enable the system to avoid deadlock, even in a condition in which a requesting processor is unable to disambiguate whether a request that initiates an invalidate command was ordered at the home node before or after the requesting processor's request. As a result, the requesting processor can fill data in certain circumstances even when the data is received at the requesting processor after an invalidate command. It will be noted that in a limited number situations, the fill-invalid field may unnecessarily invalidate a cache line in the circumstance that the invalidate command was ordered before a requesting processor's request. However, the mechanism to fill a register ensures forward progress by allowing a one-time use of the data. Also, the use of fill-invalid enables a directory-based protocol to avoid the use of fill marker FM messages for commonly occurring cases of read requests for shared access to data.

Alternatively, the directory-based protocol can be implemented in the system 200 in the absence of the fill-invalid mechanism noted above. As an example, this alternative approach can employ a FM/FM-Ack handshake for all requests (e.g., all reads and writes, regardless of whether snoops are sent), similar to the approach described herein for the null-directory protocol. However, this variant approach can utilize a different mechanism to improve the throughput when the directory state information indicates that there is no cached copy of the data. For instance, the transaction queue 262 can allow multiple active read requests. The home node can queue and hold a write request (as well as any subsequent read and write requests) in the passive state until all preceding read requests to the same address have been completed (e.g., their FM-Acks have been received and the requests have been retired). Unlike the Fill-Invalid example (where the order of the invalidate message may be ambiguous), this variant approach can apply an invalidate message to the previous cache state if the corresponding FM state is not set. The subsequent FM and data response in turn will set the cache to a shared state. This alternative approach does not require the cache controller to implement the Fill-Invalid field and implement related control. The approach also does not invalidate a line unnecessarily.

Figure 5:
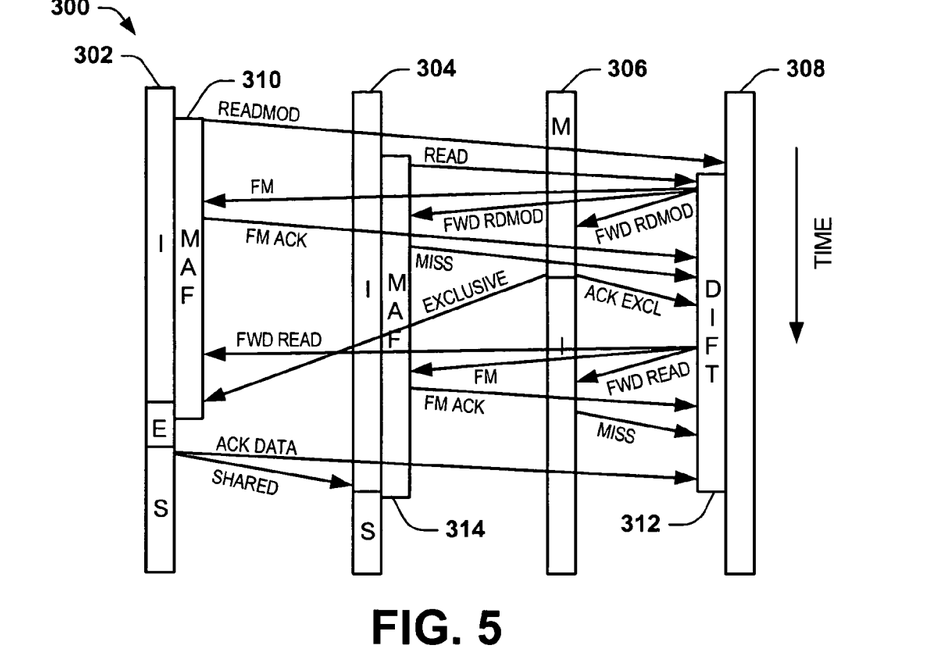
FIG. 5 depicts an example of a timing diagram for a network employing a null-directory protocol.
Figure 6:
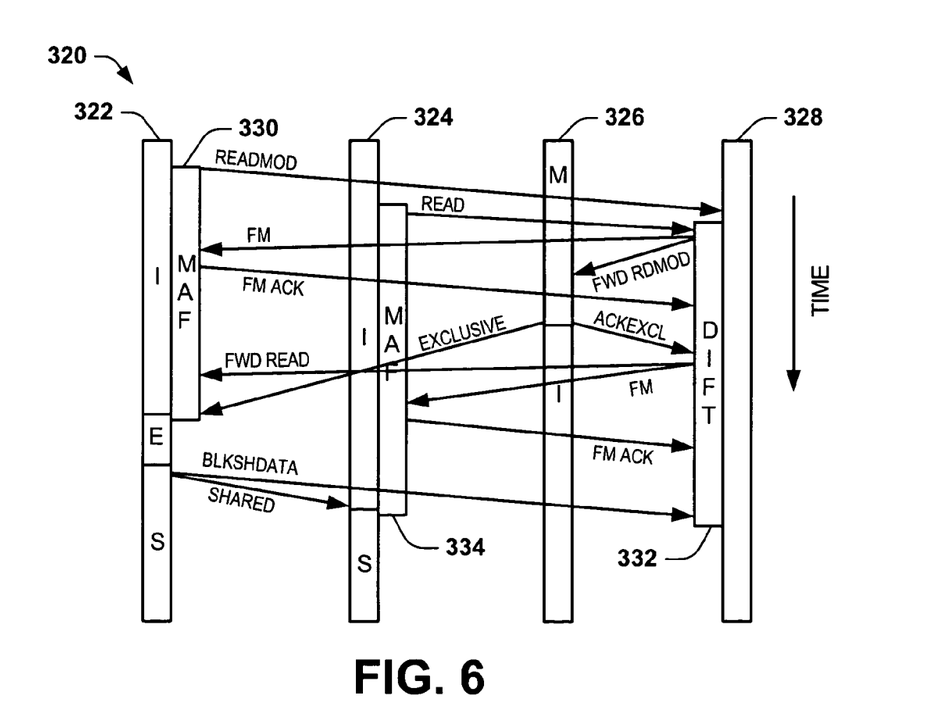
FIG. 6 depicts an example of a timing diagram for a network employing a directory-based protocol.
Figure 7:
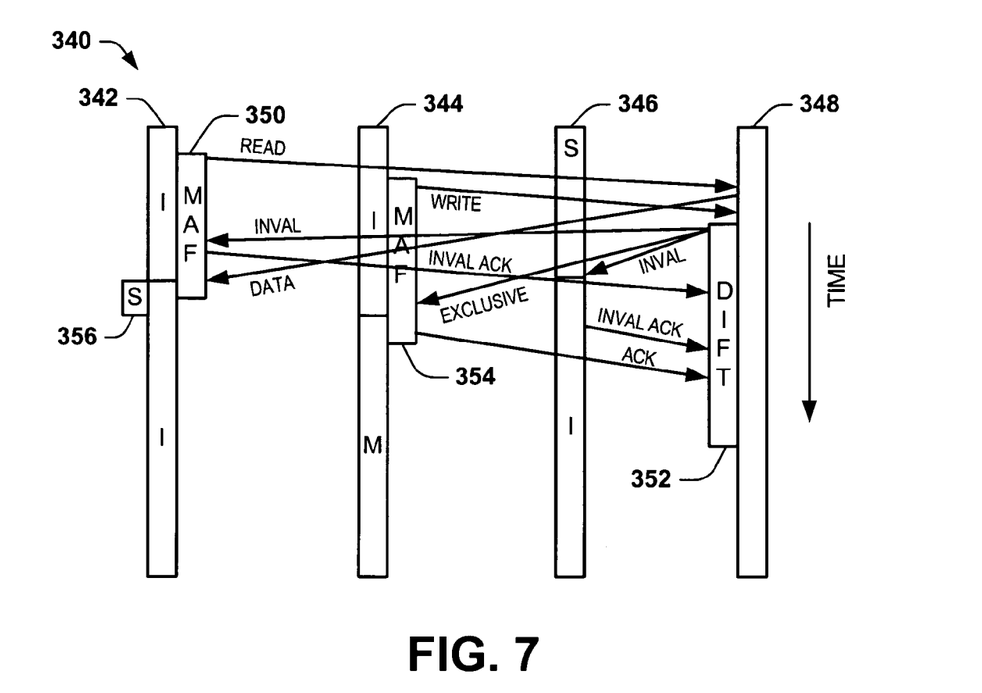
FIG. 7 depicts another example of a timing diagram for a network employing a directory-based protocol.

In view of the foregoing structural and functional features described above, certain methods that can be implemented using a coherency protocol will be better appreciated with reference to FIGS. 5-8. FIGS. 5-7 depict examples of timing diagrams for different scenarios that can occur in a multi-processor system employing a cache coherency protocol as described herein. Each of the examples illustrates various interrelationships between requests and responses and state transitions that can occur for a given line of data in different memory devices or caches. In each of these examples, time flows in the direction of an arrow labeled "TIME." Those skilled in the art may appreciate various other scenarios that can arise in a multi-processor system employing a cache coherency protocol as described herein.

FIG. 5 depicts a timing diagram associated with a multi-processor network 300 implementing a null-directory cache coherency protocol as described herein. The network 300 includes a plurality of processor nodes 302, 304 and 306 and a home node 308 associated with a given line of data. Initially, each of the nodes 302 and 304 is in the I-state and the node 306 is in the M-state. The node 302 allocates a MAF entry 310 associated with a request for data not contained in the requester's local cache and issues a request (READMOD) to the home node 308. Those skilled in the art will appreciate various other types of requests that a processor node can issue for a given line of data. The home node 308 creates an entry in a DIFT 312 in response to the READMOD request. A tag address for the requested data can be utilized to search for other transactions to the same line of data. If no prior transactions are pending, the home node 308 sends a FM message to the requesting node 302, which operates as a transaction reference defining an order for requests at the home node. The node 302 sets a FM field (e.g., a bit) and returns an acknowledgement message (FM ACK) back to the home node 308.

In parallel with the FM message, the home node also issues corresponding forward requests (FWD RDMOD) to the other nodes 304 and 306 in the network 300. Prior to the receiving the FWD RDMOD request, the node 304 allocates a MAF entry 314 and issues a READ request for the same line of data as requested by the node 302. At the time the node 304 receives the FWD RDMOD request, however, the FM field at such node has not been set. Since the FWD RDMOD corresponds to a request having an earlier order at the home node 308, the node 304 provides a MISS response to the home node. The node 306 is in the M-state when the FWD RDMOD request is received. The node 306 thus issues an EXCLUSIVE data response to the node 302 in parallel with an acknowledgement message (ACK DATA) to the home node 308. The node 306 also transitions from the M-state to the I-state in response to providing the EXCLUSIVE data response.

The home node can consider the transaction associated with the READMOD transaction from the node 302 completed after receiving the FM ACK and the snoop responses MISS and ACK DATA from the other nodes 304 and 306, respectively, in the network 300. In response to completing the transaction, the home node 308 can change the status of the READ request from the node 304 from passive to active. After activating the transaction associated with the READ request from the node 304, the home 308 sends a FM message to the requesting node 304. The node 304 sets a FM field and issues a FM ACK back to the home node 308. In parallel with the FM message, the home node 308 snoops the system by issuing corresponding forward requests (FWD READ) to the other nodes 302 and 306 in the network 300. The node 306, being in the I-state when the FWD READ request is received, provides a MISS response to the home node 308, In the example of FIG. 5, when the node 302 receives the FWD READ from the home node 308, the MAF entry 310 is still outstanding and the FM field is set. Since the FM field is set for the same line of data, the protocol understands that the FWD READ request is for a later version of the data than presently cached at the node 302. Thus, the node 302 stalls the request, such as by placing the request in a queue or other structure, thereby deferring a response until the node implements a data fill for the same line of data. Shortly after receiving the FWD READ request, the node 302 receives the EXCLUSIVE data response from the node 306 and fills the data in the appropriate cache line associated with the data. The node 302 also transitions from the I-state to the E-state in response to the EXCLUSIVE data from the node 306. The node 302 then responds to the queued FWD READ request by providing a SHARED data response to the node 304 and providing an acknowledgment message (ACK DATA) back to the home node 308. The node 304 transitions from the I-state to the S-state and retires the MAF entry 314 in response to the SHARED data response. After receiving the complete set of snoop responses (the MISS and ACK DATA responses), the home node 308 can retire the DIFT entry 312 associated with the READ request from the node 304.

FIG. 6 depicts a timing diagram associated with a multi-processor network 320 implementing a directory-based cache coherency protocol, as described herein. The network 320 includes a plurality of processor nodes 322, 324 and 326 and a home node 328 associated with a given line of data. The home node 328 includes a directory that maintains directory state information for data within the network 320. Initially, each of the nodes 322 and 324 is in the I-state and the node 326 is in the M-state. The node 322 allocates a MAF entry 330 associated with a request for data not contained in the requester's local cache and issues a request (READMOD) to the home node 328 for reading and invalidating the line of data. In the example of FIG. 6, it is assumed that the node 322 provides a request that requires the home node 328 to generate one or more snoops (e.g., in a virtual forward channel). Those skilled in the art will appreciate various other types of requests that a processor node can issue for a given line of data that requires the home node 328 to generate snoops to the system 320.

The home node 328 performs a directory look-up to ascertain whether a coherent copy of the requested data is cached in the network 320. Since an exclusive copy of the requested data is cached at another node in the network 320 (e.g., node 326 is in the M-state), the home node 328 creates an entry in a DIFT 332 in response to the READMOD request. Assuming that no prior transactions are pending at the home node 328 (e.g., based on a search for other transactions for the same line of data), the home node sends a FM message to the requesting node 322 (e.g., in a virtual forward channel). The FM message operates as a transaction reference defining an order for requests at the home node 328 to the same line of data. The node 322 sets a FM field (e.g., a bit) and provides a FM ACK message to the home node 328.

In parallel with the FM message, the home node 328 issues a corresponding FWD RDMOD snoop (e.g., in the virtual forward channel) to the node 326, which was determined as containing a M-state cached copy of the data 320. The node 326 issues an EXCLUSIVE data response to the node 322 in parallel with a data acknowledgement (ACK EXCL) message to the home node 328. The node 326 also transitions from the M-state to the I-state in response to providing the EXCLUSIVE data response. The home node 328 updates directory state information based on the ACKEXCL message, namely that the node 322 is in the E-state and that the node 326 is in the I-state. The home node 328 can consider the transaction associated with the READMOD transaction from the node 322 completed after receiving the FM ACK and the ACK-EXCL message from the node 326.

Generally in parallel with the FWD RDMOD request, the node 324 allocates a MAF entry 334 and issues a READ request to the home node 328 for the same line of data as requested by the node 322. The home node 328 can defer implementing the READ request until the READMOD request from the node 322 has completed, such as by setting the READ request to a passive status at the home node. After the READMOD transaction from the node 322 has been completed, the home node 328 can change the status of the READ request from the node 324 from passive to active. After activating the transaction associated with the READ request from the node 324, the home node 328 sends a FM message to the requesting node 324. The node 324 sets a FM field and returns a FM ACK back to the home node 328. In parallel with the FM message, the home node 328 snoops the system by issuing a corresponding forward request (FWD READ) to the node 322 based on the directory state information when the home node activates the READ request.

In the example of FIG. 6, when the node 322 receives the FWD READ from the home node 328, the MAF entry 330 is still outstanding and the FM field is set. Since the FM field is set for the same line of data, the protocol understands that the FWD READ request is for a later version of the data than presently cached at the node 322. Alternatively, if the FM field was not set at the node 322 when the FWD READ request was received, the node would respond based on the present state (I-state) of the data. Here, however, the node 322 queues the request for deferred processing. After receiving the FWD READ request, the node 322 receives the EXCLUSIVE data response from the node 326 and fills the data in the appropriate cache line associated with the data. The node 322 also transitions from the I-state to the E-state in response to the EXCLUSIVE data from the node 326 and retires the MAF entry 330. The node 322 then responds to the queued FWD READ request by providing a SHARED data response to the node 324. The node 324 transitions from the I-state to the S-state and retires the MAF entry 334 in response to the SHARED data response.

The node 322 also provides a shared data acknowledgement (BLKSHDATA) message back to the home node 328. The home node 328 updates the directory state information associated with the line of data based on the BLKSHDATA message, namely, to indicate that both of the nodes 322 and 324 have shared copies of the requested data. After receiving the BLKSHDATA message, the home node can also retire the DIFT entry 332 associated with the READ request from the node 324.

FIG. 7 depicts a timing diagram associated with a multi-processor network 340 implementing a directory-based cache coherency protocol as described herein. The network 340 includes a plurality of processor nodes 342, 344 and 346 and a home node 348 associated with a given line of data. Initially, each of the nodes 342 and 344 is in the I-state and the node 346 is in the S-state. The node 342 allocates a MAF entry 350 associated with a request for data not contained in the requester's local cache and issues a READ request to the home node 348.

The home node 348 performs a directory look-up to ascertain whether a coherent copy of the requested data is cached in the network 340. Since no exclusive copy of the requested data is cached at another node in the network 340 (e.g., in the E or M-state), the home node 348 responds directly by providing a DATA response to the node 342.

Generally in parallel with the READ transaction, the node 344 allocates a MAF entry 354 and issues a WRITE request to the home node 348 for the same line of data as requested by the node 342. The home node 348 performs a directory look-up for the requested data. Since the directory state information indicates that the nodes 342 and 346 contain shared copies of the data, the home node 348 allocates a DIFT entry 352 and issues invalidate (INVAL) commands to such nodes.

Additionally, since no exclusive copy of the requested data is cached at another node in the network 340, the home node can respond with an exclusive copy of the requested data, indicated as an EXCLUSIVE response.

Each of the nodes 342 and 346 responds to INVAL commands by providing an invalidate acknowledgement (INVAL ACK) message to the home node 348. In the example of FIG. 7, since the network 340 is an unordered network, the INVAL command arrives at the node 342 prior to the DATA response from the home node 348. As a result of receiving the INVAL while the MAF 350 is outstanding a fill-invalid bit is set in the MAF 350 to allow a single use of the requested data at the node 342. Thus, the node 342 fills the data from the SHARED data response to a local register 356 to enable a single use of the data, and the node can fill the data to cache, but the data remains in the I-state due to the INVAL command.

The node 344 receives the EXCLUSIVE data response from the home node 348 and transitions from the I-state to the M-state. The node 344 acknowledges the EXCLUSIVE data response by providing a corresponding ACK back to the home node 348. After the WRITE transaction from the node 344 has been completed (e.g., the home node has received acknowledgement messages from the nodes 342, 344 and 346), the home node 328 can retire the DIFT 352.

Figure 8:
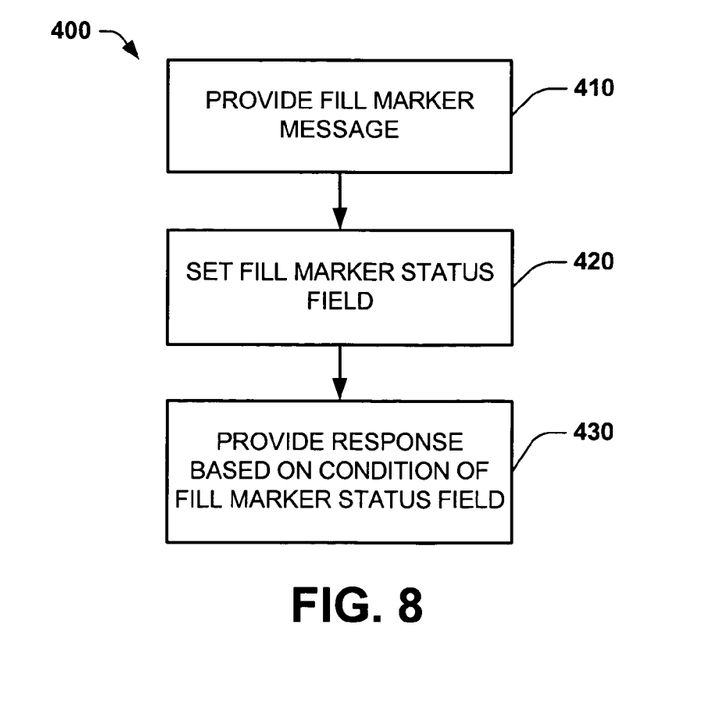
FIG. 8 depicts an example of a method.

FIG. 8 depicts an example of a method 400 that includes providing a fill marker message from a home node in response to a first request for a block of data from a requester, as shown at 410. The method 400 also includes setting a fill marker status field at the requester in response to the fill marker message from the home node, as shown at 420. The method 400 further includes providing a response from the requester to a second request for the block of data that varies temporally based on a condition of the fill marker status field at the requester, as shown at 430.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A system comprising:
    a home node that provides a transaction reference to a requester in response to a request from the requester; and
    the requester providing an acknowledgement message to the home node in response to the transaction reference, the transaction reference enabling the requester to determine an order of requests at the home node relative to the request from the requester,
    wherein the home node further comprises a transaction resource that maintains transaction information associated with each of a plurality of requests to the home node, the transaction information including an indication of whether the requester has received the transaction reference associated with the request from the requester.

2. The system of claim 1, wherein the home node provides a snoop associated with the request from the requester substantially in parallel with providing the transaction reference.

3. The system of claim 1, wherein the system employs a null-directory cache coherency protocol, the home node providing a transaction reference for each request to the home node.

4. The system of claim 1, wherein the system employs a directory-based cache coherency protocol, the home node providing a transaction reference for a selected subset of requests to the home node.

5. The system of claim 4, wherein the selected subset of requests to the home node comprises write requests and requests in response to which the home node generates at least one snoop.

6. The system of claim 4, wherein the requester is configured to employ data received in response to the request from the requester for a single use if the requester receives an invalidate command before receiving a copy of the data in response to the request from the requester and when a transaction reference has not yet been received by the requester.

7. The system of claim 1, wherein the requester comprises a first requester that provides a first request for data to the home node, the system further comprising a second requester that provides a second request for the data to the home node, the home node receiving the second request for the data subsequent to the first request for the data.

8. The system of claim 7, wherein the home node is programmed to issue a transaction reference associated with the second request based on transaction information at the home node associated with the first request indicating that the first request has been completed.

9. The system of claim 8, wherein the transaction information at the home node associated with the first request further comprises an indication that the transaction reference has been received by the first requester and an indication that the home node has received a complete set of at least one response to each of at least one snoop provided by the home node in response to the first request.

10. The system of claim 1, wherein the requester further comprises a processor having a miss address file that includes an entry associated with the request from the requester, wherein a transaction reference field in the entry associated with the request from the requester is set in response to the transaction reference from the home node.

11. The system of claim 10, wherein the processor further comprises a queue, the requester controlling whether a snoop for data from the home node is placed in the queue based on the transaction reference field.

12. The system of claim 11, wherein the processor further comprises an associated cache that includes a plurality of cache lines, the requester is configured to provide a response to the snoop for the data from the home node based on a present state of the data in a respective one of the cache lines if the transaction reference field is not set when the snoop for the data from the home node is received by the requester.

13. The system of claim 11, wherein the processor further comprises an associated cache that includes a plurality of cache lines, the requester is configured to place the snoop for the data from the home node in the queue for deferring a response if the transaction reference field is set when the snoop for the data from the home node is received by the requester.

14. The system of claim 1, wherein the system comprises an unordered network.

15. A multi-processor system comprising:
    a first requesting processor that provides a first request for data to a home node;
    a second requesting processor that provides a second request for the data to the home node; and
    the home node comprising a transaction resource for managing requests for the data, the home providing a transaction reference message to one of the first and second requesting processors, the one of the first and second requesting processors employing the transaction reference message to ascertain a relative order of the first and second requests for the data ordered at the home node, wherein the first request is ordered at the home node preceding the second request, the first requesting processor further comprises a transaction reference field associated with the first request from the requester that is set in response to the transaction reference message to enable the first requesting processor to ascertain an order of at least one request for the data from the home node relative to the first request at the home node.

16. The system of claim 15, wherein the first requesting processor further comprises a queue, the first requesting processor controlling whether a third request for the data from the home node is placed in the queue based on the transaction reference field.

17. The system of claim 16, wherein the third request for the data comprises a forward request provided by the home node in response to the second request for the data.

18. The system of claim 16, wherein the first requesting processor is configured (i) to provide a response to the third request based on a present state of the data in a respective one of the cache lines if the transaction reference field is not set when the third request is received and (ii) to place at least a portion of the third request for the data from the home node in the queue for deferring a response if the transaction reference field is set when the third request is received.

19. The system of claim 15, wherein the system employs a null-directory cache coherency protocol, the home node providing a transaction reference for each request for the data to the home node, the home node providing a forward request substantially in parallel with the transaction reference to each other processor in the system corresponding to the request from the one of the first and second requesting processors.

20. The system of claim 15, wherein the system employs a directory-based cache coherency protocol, the home node providing a transaction reference for a selected subset of requests for the data to the home node.

21. The system of claim 20, wherein the home node further comprises a directory that includes directory state information associated with the data, the home node is configured (i) to provide a forward request substantially in parallel with the transaction reference to at least one other processor in the system corresponding to the request from the one of the first and second requesting processors if the directory state information indicates that the data is cached at the at least one other processor in the system, and (ii) to provide a data response to the one of the first and second requesting processors if the directory state information indicates that the data is not cached in the system.

22. The system of claim 21, wherein the one of the first and second requesting processors is configured to employ data received in response to the request from the requester for a single use if the requester receives an invalidate command before the data is received in response to the request from the one of the first and second requesting processors and if a transaction reference associated with the first request has not been received by the requester.

23. The system of claim 15, wherein the first request is ordered at the home node subsequent to the second request and the second requesting processor is the one of the first and second requesting processors, the home node being programmed to maintain a transaction associated with the first request in a passive state until transaction information at the home node associated with the second request indicates that the second request has been completed.

24. The system of claim 23, wherein the transaction information at the home node associated with the second request further comprises an indication that the transaction reference message has been received by the second requesting processor and an indication that the home node has received a complete set of at least one response to each of at least one snoop provided by the home node in response to the second request.

25. A processor in a multi-processor network, the processor comprising:
a transaction structure that contains at least a first entry associated with a first request for data issued by the processor, the first entry including a transaction reference field that has a value based on a transaction reference message from a home node for the data, the value of the transaction reference field providing an indication of an order of transactions targeting the data at the home node; and
a controller that controls how to respond to a second request for the data received from the home node based on the value of the transaction reference field,
wherein the home node provides the transaction reference message to the processor in response to the first request.

26. The processor of claim 25, further comprising a queue capable of storing the second request for cached data, the controller controlling whether the second request for the data is placed in the queue based on the value of the transaction reference field.

27. The processor of claim 26, further comprising an associated cache that includes a plurality of cache lines, the controller enabling the processor to provide a response to the second request for the data based on a present state of the data in a respective one of the cache lines if the transaction reference field has a value indicating that the transaction reference message has not been received from the home node when the second request for the data is received.

28. The processor of claim 26, further comprising an associated cache that includes a plurality of cache lines, the controller placing the second request for the data in the queue for providing a deferred response if the transaction reference field has a value indicating that the transaction reference message has been received from the home node when the second request for the data is received.

29. The processor of claim 25, wherein the multi-processor network comprises an unordered network that employs a directory-based protocol, the first entry of the transaction structure further including a fill-invalid field, the controller setting the fill-invalid field in response to receiving an invalidate command before the data is received in response to the first request and when the transaction reference field has a value indicating that the transaction reference message has not been received from the home node, the processor being afforded a single use of the data if the fill-invalid field is set.

30. A multi-processor system comprising:
means for providing a transaction reference message substantially in parallel with at least one snoop request from a home node in response to a first request for data from a requesting processor;
means for setting a transaction reference field at the requesting processor in response to the transaction reference message;
means for responding to at least a second request provided to the requesting processor based on a condition of the transaction reference field when the at least a second request is received; and
means for managing requests received at the home node subsequent to the first request based on the acknowledgement from the requesting processor and based on whether a response has been received by the home node for the at least one snoop provided by the home node.

31. The system of claim 30, further comprising means for deferring a response to the at least a second request from the requesting processor based on the condition of the transaction reference field indicating that the at least a second request is subsequent to the first request.

32. The system of claim 30, wherein the system comprises an unordered network and employs a null-directory cache coherency protocol in which the means for providing a transaction reference message provides a transaction reference for each request that is provided to the home node.

33. The system of claim 30, wherein the system comprises an unordered network and employs a directory-based cache coherency protocol, the home node providing a transaction reference for a selected subset of requests that are provided to the home node.

34. The system of claim 30, further comprising means for providing a response from the requesting processor to the at least a second request based on the condition of the transaction reference field indicating that the at least a second request precedes the first request at the home node, the requesting processor providing the response to the at least a second request based on a present state of the data in a respective cache line of the requesting processor.

35. The system of claim 30, further comprising means for deferred processing of a transaction associated with the second request until confirming that the transaction reference message has been received by the requesting processor and that the home node has received a response to each of the at least one snoop request provided by the home node.

36. A method comprising:
providing a fill marker message from a home node in response to a first request for a block of data from a requester;
setting a fill marker status field at the requester in response to the fill marker message from the home node;
providing a response from the requester to a second request for the block of data that varies temporally based on a condition of the fill marker status field at the requester;
issuing at least one forward request for the block of data from the home node concurrently with the fill marker message in response to the first request; and
managing requests for the block of data received at the home node subsequent to the first request based on whether a response has been received by the home node for the at least one forward request received by the home node.

37. The method of claim 36, further comprising deferring a response from the requester to a second request for the block of data based on the condition of the fill marker status field indicating that the second request has a later order than the first request at the home node.

38. The method of claim 36, wherein the method is implemented in a multiprocessor system employing a null-directory cache coherency protocol, the method further comprising providing a fill marker message from the home node in response to each request for the block of data that is provided to the home node.

39. The method of claim 36, wherein the method is implemented in a multiprocessor system employing a directory-based cache coherency protocol, the method further comprising providing a fill marker message for a selected subset of requests provided to the home node that require the home node to issue at least one snoop for the block of data.

40. The method of claim 36, further comprising queuing a transaction associated with the second request for deferred processing until confirming that the transaction reference message has been received by the requesting processor and that the home node has received a response to each of the at least one snoop provided by the home node.

* * * * *